United States Patent
Oh et al.

(10) Patent No.: US 12,519,134 B2
(45) Date of Patent: *Jan. 6, 2026

(54) ELECTROLYTE SOLUTION ADDITIVE FOR LITHIUM SECONDARY BATTERY, AND NON-AQUEOUS ELECTROLYTE SOLUTION AND LITHIUM SECONDARY BATTERY WHICH INCLUDE THE SAME

(71) Applicant: LG Energy Solution, Ltd., Seoul (KR)

(72) Inventors: Jeong Woo Oh, Daejeon (KR); Hyung Tae Kim, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 985 days.

This patent is subject to a terminal disclaimer.

(21) Appl. No.: 17/623,695

(22) PCT Filed: Aug. 26, 2020

(86) PCT No.: PCT/KR2020/011427
§ 371 (c)(1),
(2) Date: Jul. 19, 2022

(87) PCT Pub. No.: WO2021/040415
PCT Pub. Date: Mar. 4, 2021

(65) Prior Publication Data
US 2022/0393235 A1     Dec. 8, 2022

(30) Foreign Application Priority Data

Aug. 30, 2019  (KR) .................. 10-2019-0107373

(51) Int. Cl.
| | |
|---|---|
| H01M 10/0567 | (2010.01) |
| C07C 309/73 | (2006.01) |
| H01M 4/02 | (2006.01) |
| H01M 4/505 | (2010.01) |
| H01M 4/525 | (2010.01) |
| H01M 4/583 | (2010.01) |
| H01M 10/052 | (2010.01) |
| H01M 10/0568 | (2010.01) |
| H01M 10/0569 | (2010.01) |

(52) U.S. Cl.
CPC ....... *H01M 10/0567* (2013.01); *C07C 309/73* (2013.01); *H01M 4/505* (2013.01); *H01M 4/525* (2013.01); *H01M 4/583* (2013.01); *H01M 10/052* (2013.01); *H01M 10/0568* (2013.01); *H01M 10/0569* (2013.01); *H01M 2004/027* (2013.01); *H01M 2004/028* (2013.01); *H01M 2300/0025* (2013.01)

(58) Field of Classification Search
None
See application file for complete search history.

(56) References Cited

U.S. PATENT DOCUMENTS

| | | |
|---|---|---|
| 3,903,298 A | 9/1975 | Smith et al. |
| 3,974,292 A | 8/1976 | Dorschner et al. |
| 2002/0197537 A1 | 12/2002 | Kim et al. |
| 2005/0244719 A1 | 11/2005 | Kim et al. |
| 2007/0059588 A1 | 3/2007 | Lee et al. |
| 2007/0059606 A1 | 3/2007 | Lee et al. |
| 2011/0200886 A1 | 8/2011 | Deguchi |
| 2016/0315354 A1 | 10/2016 | Okada et al. |
| 2018/0375158 A1 | 12/2018 | Morinaka et al. |
| 2019/0148772 A1 | 5/2019 | Park et al. |
| 2019/0198924 A1 | 6/2019 | Kim et al. |
| 2019/0207258 A1 | 7/2019 | Kim et al. |
| 2020/0176817 A1 | 6/2020 | Dou et al. |
| 2021/0028493 A1 | 1/2021 | Morinaka et al. |

FOREIGN PATENT DOCUMENTS

| | | |
|---|---|---|
| CN | 1385919 A | 12/2002 |
| CN | 101263627 A | 9/2008 |
| CN | 102187511 A | 9/2011 |
| CN | 105161753 A | 12/2015 |
| CN | 105336991 A | 2/2016 |
| CN | 108069884 A | 5/2018 |
| CN | 108075187 A | 5/2018 |

(Continued)

OTHER PUBLICATIONS

Li et al. "Nano/Microstructured Silicon-Graphite Composite Anode for High-Energy-Density Li-Ion Battery", ACS Nano 13(2), pp. 2624-2633, Feb. 2019 (Year: 2019).*

(Continued)

*Primary Examiner* — Niki Bakhtiari
*Assistant Examiner* — James A Corno
(74) *Attorney, Agent, or Firm* — Lerner David LLP

(57) ABSTRACT

An electrolyte solution additive, a non-aqueous electrolyte solution including the same, and a lithium secondary battery including the same are disclosed herein. In some embodiments, an electrolyte solution additive is represented by Formula 1

[Formula 1]

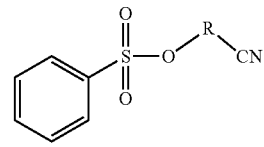

wherein, in Formula 1,

R is a substituted or unsubstituted alkylene group having 1 to 5 carbon atoms.

7 Claims, No Drawings

(56) References Cited

FOREIGN PATENT DOCUMENTS

| | | | |
|---|---|---|---|
| CN | 109103489 A | | 12/2018 |
| CN | 109873204 A | | 6/2019 |
| JP | 2015213046 A | | 11/2015 |
| JP | 2016091906 A | * | 5/2016 |
| KR | 20110079707 A | | 7/2011 |
| KR | 20160006096 A | | 1/2016 |
| KR | 20180027986 A | | 3/2018 |
| KR | 20180089530 A | | 8/2018 |
| KR | 20190055733 A | | 5/2019 |
| KR | 20190091155 A | | 8/2019 |
| WO | 2007061180 A1 | | 5/2007 |

OTHER PUBLICATIONS

International Search Report for Application No. PCT/KR2020/011427 mailed Dec. 10, 2020, 2 pages.
Extended European Search Report including Written Opinion for Application No. 20858700.6 dated Aug. 5, 2022, pp. 1-8.

* cited by examiner

ELECTROLYTE SOLUTION ADDITIVE FOR LITHIUM SECONDARY BATTERY, AND NON-AQUEOUS ELECTROLYTE SOLUTION AND LITHIUM SECONDARY BATTERY WHICH INCLUDE THE SAME

CROSS-REFERENCE TO RELATED APPLICATIONS

This application is a national phase entry under 35 U.S.C. § 371 of International Application No. PCT/KR2020/011427, filed on Aug. 26, 2020, which claims priority from Korean Patent Application No. 10-2019-0107373, filed on Aug. 30, 2019, the disclosures of which are incorporated by reference herein.

TECHNICAL FIELD

The present invention relates to an electrolyte solution additive for a lithium secondary battery, and a non-aqueous electrolyte solution and a lithium secondary battery which include the same, and more particularly, to an electrolyte solution additive for a lithium secondary battery, which may suppress dissolution of transition metal during high-temperature storage, and a non-aqueous electrolyte solution and a lithium secondary battery which include the same.

BACKGROUND ART

A lithium secondary battery is generally prepared by a method in which, after an electrode assembly is formed by disposing a separator between a positive electrode, which includes a positive electrode active material formed of a transition metal oxide containing lithium, and a negative electrode including a negative electrode active material capable of storing lithium ions and the electrode assembly is inserted into a battery case, a non-aqueous electrolyte solution that becomes a medium for transferring the lithium ions is injected thereinto and the battery case is then sealed.

The non-aqueous electrolyte solution is generally composed of a lithium salt and an organic solvent capable of dissolving the lithium salt, wherein $LiPF_6$ has been mainly used as the lithium salt. However, since a $PF_6^-$ anion is very vulnerable to heat, the $PF_6^-$ anion is thermally decomposed to generate a Lewis acid, such as $PF_5$, when the battery is exposed to high temperatures. The Lewis acid, such as $PF_5$, not only causes decomposition of the organic solvent such as ethylene carbonate, but also destructs a solid electrolyte interphase (SEI), which is formed by a reduction reaction on a surface of an active material having an operating voltage outside an electrochemical stabilization window of the electrolyte solution, to increase resistance of the battery and degrade life characteristics.

Recently, studies on lithium secondary batteries using a high-nickel (high-Ni)-based positive electrode active material containing a high concentration of nickel with excellent capacity characteristics and/or a silicon-based negative active material have been conducted as the demand for high-capacity batteries has increased. However, since the high-Ni-based positive electrode active material has low structural stability, it has a limitation in that transition metal in the positive electrode active material is dissolved to rapidly degrade battery performance when it is exposed to high temperature or high voltage. Also, with respect to a negative electrode using the silicon-based negative active material, it contains more oxygen-rich (O-rich) components in an SEI than a negative electrode using a carbon-based negative electrode active material, wherein the SEI containing the oxygen-rich components tends to be more easily decomposed when the Lewis acid, such as HF or $PF_5$, is present in an electrolyte. Thus, a decomposition reaction of the SEI on a surface of the negative electrode proceeds as charge and discharge cycles proceed, and this causes additional decomposition of the electrolyte, leading to the degradation of the battery performance.

In order to address the above-described limitations, it has conventionally been attempted to suppress high-temperature degradation by adding a nitrile-based additive, such as succinonitrile, to the electrolyte. However, with respect to the conventional nitrile-based additive, it is known that it is effective to some extent in suppressing the high-temperature degradation, but it is not suitable for a battery requiring high output characteristics due to an increase in resistance.

Therefore, there is a need to develop a lithium secondary battery which has high-capacity characteristics and may prevent performance degradation and an increase in resistance of the battery at high temperatures.

DISCLOSURE OF THE INVENTION

Technical Problem

An aspect of the present invention provides an electrolyte solution additive for a lithium secondary battery which may control an electrolyte solution decomposition reaction and may suppress dissolution of transition metal during high-temperature storage by forming a stable film on a surface of an electrode.

Another aspect of the present invention provides a non-aqueous electrolyte solution, which may achieve excellent high-temperature stability and high-temperature cycle characteristics and may minimize an increase in resistance by including the electrolyte solution additive for a lithium secondary battery, and a lithium secondary battery including the same.

Technical Solution

According to an aspect of the present invention, there is provided an electrolyte solution additive for a lithium secondary battery which comprises a compound represented by the following Formula 1.

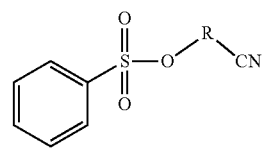

[Formula 1]

In Formula 1,
R is a substituted or unsubstituted alkylene group having 1 to 5 carbon atoms.

According to another aspect of the present invention, there is provided a non-aqueous electrolyte solution including the electrolyte solution additive for a lithium secondary battery of the present invention, a lithium salt, and an organic solvent.

According to another aspect of the present invention, there is provided a lithium secondary battery which includes a positive electrode including a positive electrode active material; a negative electrode including a negative electrode active material; a separator disposed between the negative electrode and the positive electrode; and the non-aqueous electrolyte solution of the present invention.

Advantageous Effects

Since an electrolyte solution additive for a lithium secondary battery of the present invention may not only effectively control dissolution of transition metal from a positive electrode, but may also be oxidatively decomposed to form a stable film on a surface of the positive electrode by including a cyano group and a sulfonate group in its structure, the electrolyte solution additive for a lithium secondary battery of the present invention has an effect of improving high-temperature storage performance and high-temperature lifetime of the secondary battery.

Also, the electrolyte solution additive for a lithium secondary battery of the present invention may control a low-voltage phenomenon caused by the transition metal and foreign matter in the battery. A non-aqueous electrolyte solution of the present invention including the electrolyte solution additive for a lithium secondary battery is particularly suitable for a high-power battery using a high-capacity active material such as a high-nickel-based positive electrode active material or a silicon-based negative electrode material.

MODE FOR CARRYING OUT THE INVENTION

Hereinafter, the present invention will be described in more detail.

Electrolyte Solution Additive for Lithium Secondary Battery

In the present invention, provided is an electrolyte solution additive for a lithium secondary battery which comprises a compound represented by the following Formula 1.

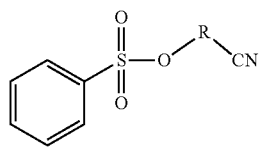

[Formula 1]

In Formula 1,
R is a substituted or unsubstituted alkylene group having 1 to 5 carbon atoms.
In Formula 1, R may be a substituted or unsubstituted alkylene group having 1 to 3 carbon atoms, and may specifically be a substituted or unsubstituted alkylene group having 1 or 2 carbon atoms.
Preferably, the compound represented by Formula 1 may be a compound represented by Formula 1a below.

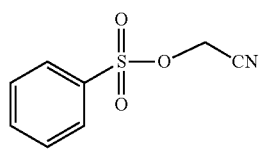

[Formula 1a]

The compound represented by Formula 1 may suppress dissolution of transition metal from a positive electrode by including a cyano group and a sulfonate group in its structure. Specifically, since the compound represented by Formula 1 is oxidatively decomposed during charge to form a stable —$SO_3$-based cathode-electrolyte interface (CEI) capable of reducing resistance of a film on a surface of the positive electrode, it may suppress dissolution of transition metal and a decomposition reaction of an electrolyte at high temperatures.

Also, the compound represented by Formula 1 may strengthen a solid electrolyte interphase (SEI) on a surface of a negative electrode through an electrochemical decomposition reaction by remaining even during long-term evaluation, and may control electrodeposition of the dissolved transition metal on the negative electrode during high-temperature storage.

In a case in which a double bond structure between carbons is included in a molecular structure of the compound of Formula 1, for example, in a case in which R of Formula 1 is an alkenylene group, it is difficult to achieve an effect of the present invention. That is, since the additive is easily reductively decomposed by a radicalized material to form a polymer-based film on the negative electrode, a large amount of the polymer-based film is decomposed at the negative electrode to increase negative electrode resistance and it is difficult for the material decomposed at the negative electrode to cause an additional film-forming reaction on the positive electrode. Even in this case, since the sulfonate group is included, the film may include a —$SO_3$-structure, but its amount is significantly smaller than that in a case where R is a single bond.

Furthermore, during long-term evaluation, an SEI/CEI-breaking reaction occurs due to a continuous intercalation and deintercalation reaction of lithium (Li), wherein, since the additive is rapidly consumed while being reductively decomposed in an initial stage when the double bond structure between carbons is included, there is no additive to compensate for the breakage so that an additional reduction and decomposition reaction of the electrolyte may occur due to the breakage of the SEI/CEI, and thus, this leads to depletion of the electrolyte solution and an increase in resistance of a cell to cause degradation.

In the present specification, the expressions "alkylene group" and "alkenylene group" mean those with two bonding sites in "alkane" and "alkene", respectively, that is, divalent groups.

Non-aqueous Electrolyte Solution

Also, in the present invention, provided is a non-aqueous electrolyte solution including the electrolyte solution additive for a lithium secondary battery of the present invention.

(1) Electrolyte Solution Additive for Lithium Secondary Battery

In this case, since a description of the electrolyte solution additive for a lithium secondary battery included in the non-aqueous electrolyte solution of the present invention overlaps with that described above, the description thereof will be omitted.

However, in consideration of an effect of forming a stable film on the surface of the electrode and an effect of suppressing the decomposition reaction of the electrolyte, the electrolyte solution additive for a lithium secondary battery may be included in an amount of 0.5 wt % to 2.3 wt %, particularly 0.5 wt % to 2 wt %, and more particularly 0.5 wt % to 1.5 wt % based on a total weight of the non-aqueous electrolyte solution. In a case in which the amount of the electrolyte solution additive for a lithium secondary battery satisfies the above range, dissolution of transition metal of a positive electrode active material at high temperatures may be effectively suppressed, and excellent high-temperature durability may be achieved. If the amount of the electrolyte solution additive for a lithium secondary battery is less than 0.5 wt %, an effect of improving the high-temperature durability is insignificant, and, if the amount of the electrolyte solution additive for a lithium secondary battery is greater than 2.3 wt %, since resistance is increased, output characteristics may be degraded.

Also, the non-aqueous electrolyte solution of the present invention may further include a lithium salt and an organic solvent.

(2) Lithium Salt

Any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_4^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$, and $SCN^-$ as an anion.

Specifically, the lithium salt may include a single material selected from the group consisting of LiCl, LiBr, LiI, LiBF$_4$, LiClO$_4$, LiB$_{10}$Cl$_{11}$, LiAlCl$_4$, LiAlO$_4$, LiPF$_6$, LiCF$_3$SO$_3$, LiCH$_3$CO$_2$, LiCF$_3$CO$_2$, LiAsF$_6$, LiSbF$_6$, LiCH$_3$SO$_3$, LiFSI (lithium bis(fluorosulfonyl)imide, LiN(SO$_2$F)$_2$), LiBETI (lithium bis(perfluoroethanesulfonyl)imide, LiN(SO$_2$CF$_2$CF$_3$)$_2$), and LiTFSI (lithium bis(trifluoromethanesulfonyl)imide, LiN(SO$_2$CF$_3$)$_2$) or a mixture of two or more thereof. In addition to them, a lithium salt typically used in an electrolyte solution of a lithium secondary battery may be used without limitation.

The lithium salt may be appropriately changed in a normally usable range, but may be included in a concentration of 0.8 M to 4.0 M, for example, 1.0 M to 3.0 M in the electrolyte solution to obtain an optimum effect of forming a film for preventing corrosion of the surface of the electrode.

If the concentration of the lithium salt is less than 0.8 M, since mobility of lithium ions is reduced, an effect of improving low-temperature output and cycle characteristics during high-temperature storage is insignificant, and, if the concentration of the lithium salt is greater than 4.0 M, non-aqueous electrolyte solution impregnability may be reduced due to an excessive increase in viscosity of the non-aqueous electrolyte solution, and the film-forming effect may be reduced.

(3) Organic Solvent

Various organic solvents typically used in a lithium electrolyte may be used as the organic solvent without limitation. For example, the organic solvent may include a cyclic carbonate-based organic solvent, a linear carbonate-based organic solvent, or a mixed organic solvent thereof.

The cyclic carbonate-based organic solvent is an organic solvent which may well dissociate the lithium salt in the electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include at least one selected from ethylene carbonate and propylene carbonate (PC).

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

In the present invention, the cyclic carbonate-based organic solvent and the linear carbonate-based organic solvent may be included in a volume ratio of 1:9 to 5:5, for example, 2:8 to 3:7.

Furthermore, in order to prepare an electrolyte solution having high ionic conductivity, the organic solvent may further include a linear ester-based organic solvent and/or a cyclic ester-based organic solvent with a low melting point and high stability at high temperatures in addition to the cyclic carbonate-based organic solvent and/or the linear carbonate-based organic solvent.

As the linear ester-based organic solvent, any one selected from the group consisting of methyl acetate, ethyl acetate, propyl acetate, methyl propionate, ethyl propionate, propyl propionate, and butyl propionate or a mixture of two or more thereof may be typically used, but the linear ester-based organic solvent is not limited thereto.

Also, the cyclic ester-based organic solvent may include at least one organic solvent selected from the group consisting of γ-butyrolactone, γ-valerolactone, γ-caprolactone, σ-valerolactone, and ε-caprolactone.

(4) Additional Additives

Also, the non-aqueous electrolyte solution for a lithium secondary battery of the present invention may further include other additional additives in addition to the compound represented by Formula 1, if necessary, in order to prevent the occurrence of the collapse of the negative electrode due to the decomposition of the non-aqueous electrolyte solution in a high power environment or to further improve low-temperature high rate discharge characteristics, high-temperature stability, overcharge prevention, and an effect of suppressing battery swelling at high temperature.

The additional additive may include at least one selected from a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

The cyclic carbonate-based compound, for example, may include vinylene carbonate (VC) or vinylethylene carbonate.

The halogen-substituted carbonate-based compound, for example, may include fluoroethylene carbonate (FEC).

The sultone-based compound, for example, may include at least one selected from 1,3-propane sultone (PS), 1,4-butane sultone, ethane sultone, 1,3-propene sultone (PRS), 1,4-butene sultone, and 1-methyl-1,3-propene sultone.

The sulfate-based compound, for example, may include at least one selected from ethylene sulfate (Esa), trimethylene sulfate (TMS), and methyl trimethylene sulfate (MTMS).

The phosphate-based compound, for example, may include at least one selected from lithium difluoro(bisoxalato)phosphate, lithium difluorophosphate, tetramethyl trimethylsilyl phosphate, trimethylsilyl phosphite, tris(2,2,2-trifluoroethyl)phosphate, and tris(trifluoroethyl)phosphite.

The borate-based compound, for example, may include tetraphenylborate or lithium oxalyldifluoroborate.

The nitrile-based compound, for example, may include at least one compound selected from succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound, for example, may include fluorobenzene, the amine-based compound may include triethanolamine or ethylene diamine, and the silane-based compound may include tetravinylsilane.

The lithium salt-based compound is a compound different from the lithium salt included in the non-aqueous electrolyte solution, wherein the lithium salt-based compound may include at least one compound selected from $LiPO_2F_2$, LiODFB, LiBOB (lithium bis(oxalato)borate (LiB$(C_2O_4)_2$)), and $LiBF_4$.

In a case in which vinylene carbonate, vinylethylene carbonate, or succinonitrile, among these additional additives, is included, a more robust SEI may be formed on the surface of the negative electrode during an initial activation process of the secondary battery.

In a case in which the $LiBF_4$ is included, high-temperature stability of the secondary battery may be improved by suppressing the generation of gas which may be generated due to the decomposition of the electrolyte solution during high-temperature storage.

Two or more additional additives may be mixed and used, and the additional additives may be included in an amount of 0.01 wt % to 50 wt %, particularly, 0.01 wt % to 10 wt %, and preferably 0.05 wt % to 5 wt % based on the total weight of the non-aqueous electrolyte solution. If the amount of the additional additive is less than 0.01 wt %, an effect of improving low-temperature output, high-temperature storage characteristics, and high-temperature life characteristics of the battery is insignificant, and, if the amount of the additional additive is greater than 50 wt %, a side reaction may excessively occur during charge and discharge of the battery due to the excessive amount of the additive. Particularly, when the excessive amount of the additives for forming an SEI is added, the additives for forming an SEI may not be sufficiently decomposed at high temperature so that they may be present in the form of an unreacted material or precipitates in the electrolyte solution at room temperature. Accordingly, a side reaction that degrades life or resistance characteristics of the secondary battery may occur.

Lithium Secondary Battery

Next, a lithium secondary battery according to the present invention will be described.

The lithium secondary battery according to the present invention includes a positive electrode, a negative electrode, a separator disposed between the positive electrode and the negative electrode, and a non-aqueous electrolyte solution, and, in this case, the non-aqueous electrolyte solution is the non-aqueous electrolyte solution according to the present invention. Since the non-aqueous electrolyte solution has been described above, a description thereof will be omitted and other components will be described below.

(1) Positive Electrode

The positive electrode according to the present invention may include a positive electrode active material layer including a positive electrode active material, and, if necessary, the positive electrode active material layer may further include a conductive agent and/or a binder.

The positive electrode active material is a compound capable of reversibly intercalating and deintercalating lithium, wherein the positive electrode active material may specifically include a lithium composite metal oxide including lithium and at least one transition metal such as cobalt, manganese, nickel, or aluminum. More specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$)), lithium-nickel-cobalt-based oxide (e.g., $LiNi_{1-Y1}Co_{Y1}O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$)), lithium-nickel-manganese-cobalt-based oxide (e.g., $Li(Ni_{p1}Co_{q1}Mn_{r1})O_2$ (where $0<p1<1$, $0<q1<1$, $0<r1<1$, and $p1+q1+r1=1$) or $Li(Ni_{p2}Co_{q2}Mn_{r2})O_4$ (where $0<p2<2$, $0<q2<2$, $0<r2<2$, and $p2+q2+r2=2$), or lithium-nickel-cobalt-transition metal (M) oxide (e.g., $Li(Ni_{p3}Co_{q3}Mn_{r3}M_{S1})O_2$ (where M is selected from the group consisting of aluminum (Al), iron (Fe), vanadium (V), chromium (Cr), titanium (Ti), tantalum (Ta), magnesium (Mg), and molybdenum (Mo), and p3, q3, r3, and S1 are atomic fractions of each independent elements, wherein $0<p3<1$, $0<q3<1$, $0<r3<1$, $0<S1<1$, and $p3+q3+r3+S1=1$), and any one thereof or a compound of two or more thereof may be included.

Specifically, the positive electrode active material may be a lithium composite transition metal oxide having an amount of nickel among transition metals of 50 atm % or more, for example, 70 atm % or more, and, more specifically, may be a lithium nickel cobalt manganese-based oxide.

The positive electrode active material may be a lithium composite transition metal oxide represented by Formula 2 below.

$$Li_x[Ni_yCo_zMn_wM^1_v]O_{2-p}A_p \qquad \text{[Formula 2]}$$

In Formula 2, $M^1$ is at least one element selected from the group consisting of tungsten (W), copper (Cu), iron (Fe), vanadium (V), chromium (Cr), titanium (Ti), zirconium (Zr), zinc (Zn), aluminum (Al), indium (In), tantalum (Ta), yttrium (Y), lanthanum (La), strontium (Sr), gallium (Ga), scandium (Sc), gadolinium (Gd), samarium (Sm), calcium (Ca), cerium (Ce), niobium (Nb), magnesium (Mg), boron (B), and molybdenum (Mo), A is at least one element selected from the group consisting of fluorine (F), chlorine (Cl), bromine (Br), iodine (I), astatine (At), and sulfur (S), and $0.8 \leq x \leq 1.2$, $0.5 \leq y < 1$, $0 < z < 0.5$, $0 < w < 0.5$, $0 \leq v \leq 0.2$, and $0 \leq p \leq 0.2$.

In Formula 2, $M^1$ is a doping element substituted for transition metal sites, and A is an element substituted for oxygen sites.

x represents an atomic ratio of lithium to total transition metals in the lithium nickel cobalt manganese-based oxide, wherein x may be in a range of 0.8 to 1.2, for example, 1 to 1.2.

y represents an atomic ratio of nickel among the transition metals in the lithium nickel cobalt manganese-based oxide, wherein y may be in a range of 0.5 or more to less than 1, preferably 0.7 to 1, and more preferably 0.75 to 0.98. Since higher capacity may be achieved as an amount of the nickel among the transition metals is increased, that the atomic ratio of the nickel is 0.5 or more is more advantageous for achieving high capacity.

z represents an atomic ratio of cobalt among the transition metals in the lithium nickel cobalt manganese-based oxide, wherein z may be in a range of greater than 0 to less than 0.5, preferably 0.01 to 0.3, and more preferably 0.01 to 0.25.

w represents an atomic ratio of manganese among the transition metals in the lithium nickel cobalt manganese-based oxide, wherein w may be in a range of greater than 0 to less than 0.5, preferably 0.01 to 0.3, and more preferably 0.01 to less than 0.25.

v represents an atomic ratio of the doping element $M^1$ doped into the transition metal sites in the lithium nickel cobalt manganese-based oxide, wherein v may be in a range of 0 to 0.2, for example, 0 to 0.1. In a case in which the doping element $M^1$ is added, there is an effect of improving structural stability of the lithium nickel cobalt manganese-based oxide, but, since capacity may be reduced when the amount of the doping element is increased, it is desirable that the doping element is included at an atomic ratio of 0.2 or less.

p represents an atomic ratio of the element A substituted for the oxygen sites, wherein p may be in a range of 0 to 0.2, for example, 0 to 0.1.

In Formula 2, $y+z+w+v=1$.

Specific examples of the lithium nickel cobalt manganese-based oxide may be $LiNi_{0.5}Co_{0.2}Mn_{0.3}O_2$, $LiNi_{0.5}Co_{0.3}Mn_{0.2}O_2$, $LiNi_{0.6}Co_{0.2}Mn_{0.2}O_2$, or $LiNi_{0.8}Co_{0.1}Mn_{0.1}O_2$, but the lithium nickel cobalt manganese-based oxide is not limited thereto.

The positive electrode active material may be included in an amount of 80 wt % to 98 wt %, for example, 85 wt % to 98 wt % based on a total weight of the positive electrode active material layer. When the positive electrode active material is included in an amount within the above range, excellent capacity characteristics may be exhibited.

Next, the conductive agent is used to provide conductivity to the electrode, wherein any conductive agent may be used without particular limitation as long as it has electron conductivity without causing adverse chemical changes in the battery.

Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used.

The conductive agent may be included in an amount of 0.1 wt % to 10 wt %, for example, 0.1 wt % to 5 wt % based on the total weight of the positive electrode active material layer.

Next, the binder improves the adhesion between the positive electrode active material particles and the adhesion between the positive electrode active material and a current collector.

Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer, a sulfonated-ethylene-propylene-diene polymer, a styrene-butadiene rubber (SBR), and a fluorine rubber, and any one thereof or a mixture of two or more thereof may be used. The binder may be included in an amount of 0.1 wt % to 15 wt %, for example, 0.1 wt % to 10 wt % based on the total weight of the positive electrode active material layer.

The positive electrode of the present invention as described above may be prepared by a method of preparing a positive electrode which is known in the art. For example, the positive electrode may be prepared by a method in which a positive electrode collector is coated with a positive electrode slurry, which is prepared by dissolving or dispersing the positive electrode active material, the binder, and/or the conductive agent in a solvent, dried, and then rolled, or a method in which the positive electrode slurry is cast on a separate support, and a film separated from the support is then laminated on the positive electrode collector.

The positive electrode collector is not particularly limited as long as it has conductivity without causing adverse chemical changes in the battery, and, for example, stainless steel; aluminum; nickel; titanium; fired carbon; or aluminum or stainless steel that is surface-treated with one of carbon, nickel, titanium, silver, or the like may be used.

Also, the positive electrode collector may typically have a thickness of 3 μm to 500 μm, and microscopic irregularities may be formed on the surface of the collector to improve the adhesion of the positive electrode material. The positive electrode collector, for example, may be used in various shapes such as that of a film, a sheet, a foil, a net, a porous body, a foam body, a non-woven fabric body, and the like.

The solvent may be a solvent normally used in the art, and may include at least one selected from dimethyl sulfoxide (DMSO), isopropyl alcohol, N-methylpyrrolidone (NMP), acetone, and water. An amount of the solvent used may be sufficient if the positive electrode material mixture may be adjusted to have appropriate viscosity in consideration of a coating thickness of the positive electrode material mixture, manufacturing yield, and workability, and is not particularly limited.

(2) Negative Electrode

Next, a negative electrode will be described.

The negative electrode according to the present invention includes a negative electrode active material layer including a negative electrode active material, and the negative electrode active material layer may further include a conductive agent and/or a binder, if necessary.

The negative electrode active material may include various negative electrode active materials used in the art, for example, a carbon-based negative electrode active material, a silicon-based negative electrode active material, or a mixture thereof.

According to an embodiment, the negative electrode active material may include a carbon-based negative electrode active material, and, as the carbon-based negative electrode active material, various carbon-based negative electrode active materials used in the art, for example, a graphite-based materials such as natural graphite, artificial graphite, and Kish graphite; pyrolytic carbon, mesophase pitch based carbon fiber, meso-carbon microbeads, mesophase pitches, high-temperature sintered carbon such as petroleum or coal tar pitch derived cokes, soft carbon, and hard carbon may be used. A shape of the carbon-based negative electrode active material is not particularly limited, and materials of various shapes, such as an irregular shape, planar shape, flaky shape, spherical shape, or fibrous shape, may be used.

Preferably, the carbon-based negative electrode active material may include at least one of natural graphite and artificial graphite. More preferably, the carbon-based negative electrode active material may include natural graphite and artificial graphite. In a case in which the natural graphite and the artificial graphite are used together, adhesion with the current collector may be increased to suppress exfoliation of the active material.

According to another embodiment, the negative electrode active material may include a carbon-based negative electrode active material and a silicon-based negative electrode active material.

Specific examples of the carbon-based negative electrode active material are the same as described above.

The silicon-based negative electrode active material, for example, may include at least one selected from the group consisting of metallic silicon (Si), silicon oxide ($SiO_x$, where $0<x\leq2$), silicon carbide (SiC), and a Si—Y alloy (where Y is an element selected from the group consisting of alkali metal, alkaline earth metal, a Group 13 element, a Group 14 element, transition metal, a rare earth element, and a combination thereof, and is not Si). The element Y may be selected from the group consisting of Mg, Ca, Sr, barium (Ba), radium (Ra), Sc, Y, Ti, Zr, hafnium (Hf), rutherfordium (Rf), V, Nb, Ta, dubnium (Db), Cr, Mo, W, seaborgium (Sg), technetium (Tc), rhenium (Re), bohrium (Bh), Fe, lead (Pb), ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, Ga, tin (Sn), In, germanium (Ge), phosphorus (P), arsenic (As), antimony (Sb), bismuth (Bi), S, selenium (Se), tellurium (Te), polonium (Po), and a combination thereof.

Since the silicon-based negative electrode active material has higher capacity characteristics than the carbon-based negative electrode active material, better capacity characteristics may be obtained when the silicon-based negative electrode active material is further included. However, with respect to a negative electrode including the silicon-based negative electrode active material, it contains more O-rich components in the SEI than a graphite negative electrode, and the SEI containing the O-rich components tends to be more easily decomposed when a Lewis acid, such as HF or $PF_5$, is present in the electrolyte. Thus, with respect to the negative electrode including the silicon-based negative electrode active material, there is a need to suppress the formation of the Lewis acid, such as HF and $PF_5$, or remove (or scavenge) the formed Lewis acid in order to stably maintain the SEI. Since the non-aqueous electrolyte according to the present invention includes the electrolyte solution additive capable of forming a stable film on the positive electrode and the negative electrode, it may effectively suppress the decomposition of the SEI when the negative electrode including the silicon-based negative electrode active material is used.

A mixing ratio of the silicon-based negative electrode active material to the carbon-based negative electrode active material may be in a range of 3:97 to 99:1, for example, 5:95 to 15:85, as a weight ratio. In a case in which the mixing ratio of the silicon-based negative electrode active material to the carbon-based negative electrode active material satisfies the above range, since a volume expansion of the silicon-based negative electrode active material is suppressed while capacity characteristics are improved, excellent cycle performance may be secured.

The negative electrode active material may be included in an amount of 80 wt % to 99 wt % based on a total weight of the negative electrode active material layer. In a case in which the amount of the negative electrode active material satisfies the above range, excellent capacity characteristics and electrochemical properties may be obtained.

Next, the conductive agent is a component for further improving conductivity of the negative electrode active material, wherein the conductive agent may be added in an amount of 10 wt % or less, for example, 5 wt % or less based on the total weight of the negative electrode active material layer. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The binder is a component that assists in the binding between the conductive agent, the active material, and the current collector, wherein the binder is commonly added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene polymer, a sulfonated-ethylene-propylene-diene polymer, a styrene-butadiene rubber, a nitrile-butadiene rubber, and a fluoro rubber.

The negative electrode may be prepared by a method of preparing a negative electrode which is known in the art. For example, the negative electrode may be prepared by a method in which a negative electrode collector is coated with a negative electrode slurry, which is prepared by dissolving or dispersing the negative electrode active material as well as selectively the binder and the conductive agent in a solvent, rolled and dried, or may be prepared by casting the negative electrode slurry on a separate support and then laminating a film separated from the support on the negative electrode collector.

The negative electrode collector is not particularly limited as long as it has high conductivity without causing adverse chemical changes in the battery, and, for example, copper; stainless steel; aluminum; nickel; titanium; fired carbon;

copper or stainless steel that is surface-treated with one of carbon, nickel, titanium, silver, or the like; or an aluminum-cadmium alloy may be used.

Also, the negative electrode collector may typically have a thickness of 3 μm to 500 μm, and, similar to the positive electrode collector, microscopic irregularities may be formed on the surface of the collector to improve the adhesion of the negative electrode active material. The negative electrode collector, for example, may be used in various shapes such as that of a film, a sheet, a foil, a net, a porous body, a foam body, a non-woven fabric body, and the like.

The solvent may be a solvent normally used in the art, and may include at least one selected from dimethyl sulfoxide (DMSO), isopropyl alcohol, N-methylpyrrolidone (NMP), acetone, and water. An amount of the solvent used may be sufficient if the negative electrode slurry may be adjusted to have appropriate viscosity in consideration of a coating thickness of the negative electrode material mixture, manufacturing yield, and workability, and is not particularly limited.

(3) Separator

The lithium secondary battery according to the present invention includes a separator between the positive electrode and the negative electrode.

The separator separates the negative electrode and the positive electrode and provides a movement path of lithium ions, wherein any separator may be used without particular limitation as long as it is typically used as a separator in a lithium secondary battery, and particularly, a separator having high moisture-retention ability for an electrolyte solution as well as low resistance to the transfer of electrolyte ions may be used.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

The lithium secondary battery according to the present invention may be suitably used in portable devices, such as mobile phones, notebook computers, and digital cameras, and electric cars.

According to another embodiment of the present invention, a battery module including the lithium secondary battery as a unit cell and a battery pack including the battery module are provided.

The battery module or the battery pack may be used as a power source of at least one medium and large sized device of a power tool; an electric vehicle (EV) including a hybrid electric vehicle (HEV) and a plug-in hybrid electric vehicle (PHEV); and a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples.

EXAMPLES

Example 1

(Non-aqueous Electrolyte Solution Preparation)

After $LiPF_6$ was dissolved in 99.5 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte solution was prepared by adding 0.5 g of the compound represented by Formula 1a as an additive.

Positive Electrode Preparation

A lithium nickel-manganese-cobalt-based oxide ($LiNi_{0.8}Co_{0.1}Mn_{0.1}O_2$; NCM811) as positive electrode active material particles, carbon black as a conductive agent, and polyvinylidene fluoride (PVDF), as a binder, were added to N-methyl-2-pyrrolidone (NMP), as a solvent, at a weight ratio of 90:5:5 to prepare a positive electrode active material slurry (solid content 48 wt %). A 100 μm thick positive electrode collector (Al thin film) was coated with the positive electrode active material slurry, dried, and then roll-pressed to prepare a positive electrode.

Negative Electrode Preparation

A negative electrode active material (artificial graphite: SiO=95:5 weight ratio), PVDF as a binder, and carbon black, as a conductive agent, were added to NMP, as a solvent, at a weight ratio of 95:2:3 to prepare a negative electrode active material slurry (solid content: 70 wt %). A 90 μm thick negative electrode collector (Cu thin film) was coated with the negative electrode active material slurry, dried, and then roll-pressed to prepare a negative electrode.

Secondary Battery Preparation

After an electrode assembly was prepared by a conventional method of sequentially stacking a polyethylene porous film with the positive electrode and negative electrode prepared by the above-described methods, the electrode assembly was put in a pouch-type secondary battery case, and the above-prepared non-aqueous electrolyte solution was injected thereinto to prepare a lithium secondary battery.

Example 2

A lithium secondary battery was prepared in the same manner as in Example 1 except that, after $LiPF_6$ was dissolved in 99 g of a non-aqueous organic solvent such that a concentration of the $LiPF_6$ was 1.0 M, a non-aqueous electrolyte solution was prepared by adding 1.0 g of the compound represented by Formula 1a as an additive.

Example 3

A lithium secondary battery was prepared in the same manner as in Example 1 except that, after $LiPF_6$ was dissolved in 98 g of a non-aqueous organic solvent such that a concentration of the LiPF$_6$ was 1.0 M, a non-aqueous electrolyte solution was prepared by adding 2.0 g of the compound represented by Formula 1a as an additive.

Example 4

A lithium secondary battery was prepared in the same manner as in Example 1 except that, after LiPF$_6$ was dissolved in 97.5 g of a non-aqueous organic solvent such that a concentration of the LiPF$_6$ was 1.0 M, a non-aqueous electrolyte solution was prepared by adding 2.5 g of the compound represented by Formula 1a as an additive.

Comparative Example 1

A lithium secondary battery was prepared in the same manner as in Example 1 except that LiPF$_6$ was dissolved in 100 g of a non-aqueous organic solvent such that a concentration of the LiPF$_6$ was 1.0 M, and a non-aqueous electrolyte solution was prepared without adding an additive.

Comparative Example 2

A lithium secondary battery was prepared in the same manner as in Example 1 except that, after LiPF$_6$ was dissolved in 98 g of a non-aqueous organic solvent such that a concentration of the LiPF$_6$ was 1.0 M, a non-aqueous electrolyte solution was prepared by adding 2.0 g of the following compound represented by Formula 3 as an additive.

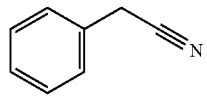

[Formula 3]

Comparative Example 3

A lithium secondary battery was prepared in the same manner as in Example 1 except that, after LiPF$_6$ was dissolved in 98 g of a non-aqueous organic solvent such that a concentration of the LiPF$_6$ was 1.0 M, a non-aqueous electrolyte solution was prepared by adding 2.0 g of the following compound represented by Formula 4 as an additive.

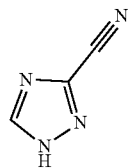

[Formula 4]

Experimental Example 1: Characteristics Evaluation After High-temperature Storage (1)

After each of the lithium secondary batteries prepared in Examples 1 to 4 and Comparative Examples 1 to 3 was fully charged (state of charge (SOC) of 100%) at 0.33 C rate to 4.2 V and a cut-off current of 50 mA under a constant current/ constant voltage condition at room temperature (25° C.) and discharged at 0.33 C rate under a constant current condition to 3 V, a volume (thickness) before high-temperature storage of each lithium secondary battery was measured with a plate thickness gauge with a weight of 300 g. Subsequently, discharge capacity before high-temperature storage was measured using PNE-0506 charge/discharge equipment (manufacturer: PNE solution).

Then, after each lithium secondary battery was stored at 60° C. for 4 weeks, volume increase rate (%) and capacity retention (%) after high-temperature storage were measured for each lithium secondary battery. The volume increase rate (%) was calculated according to [Equation 1] below, and the capacity retention (%) was calculated according to [Equation 2] below. Measurement results are listed in Table 1 below.

Volume increase rate (%): {(volume of lithium secondary battery after 4 weeks storage−volume of lithium secondary battery before storage)/volume of lithium secondary battery before storage}×100   Equation 1

Capacity retention (%): (discharge capacity after 4 weeks storage/discharge capacity before storage)×100   Equation 2

Experimental Example 2: Characteristics Evaluation After High-temperature Storage (2)

After each of the lithium secondary batteries prepared in Examples 1 to 4 and Comparative Examples 1 to 3 was charged at 0.33 C rate to 4.2 V under a constant current/ constant voltage condition at room temperature (25° C.), each lithium secondary battery was discharged to a DOD (depth of discharge) of 50% to adjust a state of charge (SOC) to 50% and then discharged at 2.5 C rate for 10 seconds, and initial resistance was measured using PNE-0506 charge/ discharge equipment (manufacturer: PNE solution).

Then, after each lithium secondary battery was stored at 60° C. for 4 weeks, a resistance increase rate (%) of the lithium secondary battery was measured. The resistance increase rate (%) was calculated according to [Equation 3] below. Measurement results are listed in Table 1 below.

Resistance increase rate (%)={(resistance after 4 weeks storage−resistance before high-temperature storage)/resistance before high-temperature storage}×100   Equation 3

TABLE 1

| | Additive | | Volume increase rate (%) | Capacity retention (%) | Initial resistance (mohm) | Resistance increase rate (%) |
| --- | --- | --- | --- | --- | --- | --- |
| | Formula | Amount (wt %) | | | | |
| Example 1 | 1a | 0.5 | 5.45 | 89.75 | 43.2 | 3.83 |
| Example 2 | 1a | 1.0 | 3.50 | 91.21 | 44.7 | 2.47 |
| Example 3 | 1a | 2.0 | 1.24 | 92.35 | 46.5 | 1.21 |
| Example 4 | 1a | 2.5 | 1.10 | 92.41 | 51.6 | 1.03 |
| Comparative Example 1 | — | 0 | 7.28 | 89.0 | 42.8 | 5.64 |
| Comparative Example 2 | 3 | 2 | 7.15 | 88.74 | 53.4 | 7.56 |
| Comparative Example 3 | 4 | 2 | 7.23 | 87.65 | 56.5 | 9.89 |

Referring to Table 1, with respect to the lithium secondary batteries of Examples 1 to 3 which respectively included the non-aqueous electrolyte solutions including the additive of the present invention, it may be understood that volume increase rates, capacity retentions, initial resistances, and resistance increase rates after high-temperature storage were all improved in comparison to those of the secondary batteries of Comparative Examples 2 and 3 which respectively included the non-aqueous electrolyte solutions including only one of the compounds of Formula 3 or 4 as an additive.

In contrast, since the secondary battery of Comparative Example 1 including the non-aqueous electrolyte solution without an additive had no side reaction caused by the additive, it may be understood that initial resistance was improved in comparison to those of the secondary batteries of Examples 1 to 4, but volume increase rate, capacity retention, and resistance increase rate were all degraded in comparison to those of the secondary batteries of Examples 1 to 4.

With respect to the secondary battery of Example 4 including the excessive amount of the additive, it may be understood that volume increase rate and capacity retention were improved in comparison to those of the lithium secondary batteries of Examples 1 to 3, but initial resistance was slightly increased due to the side reaction caused by the excessive amount of the additive. In this case, the resistance increase rate (%) is a value calculated on the basis of an initial resistance value, wherein it may be understood that resistance increase rate (%) of the secondary battery of Example 4 with higher initial resistance than the secondary batteries of Examples 1 to 3 was rather lower than those of the secondary batteries of Examples 1 to 3.

Experimental Example 3: High-temperature Cycle Characteristics Evaluation

That each of the lithium secondary batteries prepared in Examples 1 to 4 and Comparative Examples 1 to 3 was charged at 0.33 C rate to 4.2 V under a constant current/constant voltage condition at 45° C. and then discharged at 0.33 C rate under a constant current condition to 3 V was defined as one cycle and capacity retention (%) and resistance increase rate (%) were measured after 160 cycles of charge and discharge were performed. The capacity retention (%) was calculated according to [Equation 4] below, and the resistance increase rate (%) was calculated according to [Equation 5] below. Measurement results are listed in Table 2 below.

Capacity retention (%)=(discharge capacity after 160 cycles/discharge capacity after 1 cycle)×100    Equation 4

Resistance increase rate (%)={(resistance after 160 cycles−resistance after 1 cycle)/resistance after 1 cycle}×100    Equation 5

TABLE 2

|  | Additive | | Capacity retention (%) | Initial resistance (mohm) | Resistance increase rate (%) |
|  | Formula | Amount (wt %) | | | |
| --- | --- | --- | --- | --- | --- |
| Example 1 | 1a | 0.5 | 86.74 | 85.51 | 9.42 |
| Example 2 | 1a | 1.0 | 88.24 | 86.95 | 6.17 |
| Example 3 | 1a | 2.0 | 88.91 | 87.56 | 4.13 |
| Example 4 | 1a | 2.5 | 89.14 | 90.87 | 3.97 |
| Comparative Example 1 | — | 0 | 80.97 | 84.84 | 12.45 |
| Comparative Example 2 | 3 | 2 | 81.45 | 92.45 | 11.76 |
| Comparative Example 3 | 4 | 2 | 82.65 | 95.79 | 10.64 |

Referring to Table 2, with respect to the lithium secondary batteries of Examples 1 to 3 which respectively included the non-aqueous electrolyte solutions including the additive of the present invention, it may be understood that capacity retentions, initial resistances, and resistance increase rates after high-temperature cycles were all improved in comparison to that of the secondary battery of Comparative Example 1 including the non-aqueous electrolyte solution without using an additive or those of the secondary batteries of Comparative Examples 2 and 3 which respectively included the non-aqueous electrolyte solutions including only one of the compounds of Formula 3 or 4 as an additive.

With respect to the secondary battery of Example 4 including the excessive amount of the additive, it may be understood that capacity retention and resistance increase rate were improved in comparison to those of the lithium secondary batteries of Examples 1 to 3, but initial resistance was slightly increased due to the side reaction caused by the excessive amount of the additive. In this case, the resistance increase rate (%) is a value calculated on the basis of an initial resistance value, wherein it may be understood that resistance increase rate (%) of the secondary battery of Example 4 with higher initial resistance than the secondary batteries of Examples 1 to 3 was lower than those of the secondary batteries of Examples 1 to 3.

Experimental Example 4: Evaluation of Voltage Drop Rate (%) After High-temperature Storage After each of the secondary batteries prepared in Examples 1 to 4 and Comparative Examples 1 to 3 was fully charged (SOC of 100%) at 0.33 C rate to 4.2 V and a cut-off current of 50 mA under a constant current/constant voltage condition at room temperature (25° C.), an initial voltage (4.2 V) before high-temperature storage was measured using PNE-0506 charge/discharge equipment (manufacturer: PNE solution).

Subsequently, after each lithium secondary battery was stored at a high temperature of 72° C. for 60 days, a voltage drop rate (%) was evaluated. The voltage drop rate (%) was calculated according to [Equation 6] below. Measurement results are listed in Table 3 below.

Voltage Drop rate (%)={(voltage after 60 days−initial voltage)/initial voltage}×100    Equation 6

TABLE 3

|  | Additive | | Voltage after 60 days | Voltage drop rate (%) |
|  | Formula | Amount (wt %) | | |
| --- | --- | --- | --- | --- |
| Example 1 | 1a | 0.5 | 4.12 | 1.90 |
| Example 2 | 1a | 1.0 | 4.16 | 0.95 |
| Example 3 | 1a | 2.0 | 4.19 | 0.24 |

TABLE 3-continued

| | Additive | | Voltage after 60 days | Voltage drop rate (%) |
|---|---|---|---|---|
| | Formula | Amount (wt %) | | |
| Example 4 | 1a | 2.5 | 4.19 | 0.24 |
| Comparative Example 1 | — | 0 | 3.65 | 13.1 |
| Comparative Example 2 | 3 | 2 | 3.84 | 8.57 |
| Comparative Example 3 | 4 | 2 | 3.97 | 5.48 |

The expression "voltage drop" denotes a phenomenon in which, when transition metal dissolved from a positive electrode consumes electrons while being reduced at a negative electrode side or when a film (SEI) is not properly formed on a negative electrode, an electrolyte solution increases a voltage of the negative electrode while being easily reductively decomposed to drop a voltage of a full cell.

Referring to Table 3, with respect to the lithium secondary batteries of Examples 1 to 4 which respectively included the non-aqueous electrolyte solutions including the additive of the present invention, it may be understood that, even if stored at 72° C. for 60 days, voltage drop rates (%) after high-temperature storage were all improved in comparison to that of the secondary battery of Comparative Example 1 including the non-aqueous electrolyte solution without using an additive or those of the secondary batteries of Comparative Examples 2 and 3 which respectively included the non-aqueous electrolyte solutions including only one of the compounds of Formula 3 or 4 as an additive.

The invention claimed is:

1. An electrolyte solution for a lithium secondary battery, comprising:
   a lithium salt;
   an organic solvent; and
   an additive comprising a compound represented by Formula 1a:

[Formula 1a]

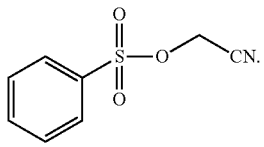

2. The non-aqueous electrolyte solution of claim 1, wherein the additive is present in an amount of 0.5 wt % to 2.5 wt % based on a total weight of the non-aqueous electrolyte solution.

3. A lithium secondary battery comprising:
   a positive electrode including a positive electrode active material;
   a negative electrode including a negative electrode active material;
   a separator disposed between the negative electrode and the positive electrode; and
   the non-aqueous electrolyte solution of claim 1.

4. The lithium secondary battery of claim 3, wherein the positive electrode active material is a lithium composite transition metal oxide having an amount of nickel of 50 atm % or more, based on the total amount of transition metals in the lithium composite transition metal oxide.

5. The lithium secondary battery of claim 3, wherein the positive electrode active material is a lithium composite transition metal oxide represented by Formula 2:

$$Li_x[Ni_yCo_zMn_wM^1_v]O_{2-p}A_p \quad \text{[Formula 2]}$$

wherein, in Formula 2, $M^1$ is at least one element selected from the group consisting of tungsten (W), copper (Cu), iron (Fe), vanadium (V), chromium (Cr), titanium (Ti), zirconium (Zr), zinc (Zn), aluminum (Al), indium (In), tantalum (Ta), yttrium (Y), lanthanum (La), strontium (Sr), gallium (Ga), scandium (Sc), gadolinium (Gd), samarium (Sm), calcium (Ca), cerium (Ce), niobium (Nb), magnesium (Mg), boron (B), and molybdenum (Mo), A is at least one element selected from the group consisting of fluorine (F), chlorine (Cl), bromine (Br), iodine (I), astatine (At), and sulfur(S), and $0.8 \leq x \leq 1.2$, $0.5 \leq y < 1$, $0 < z < 0.5$, $0 < w < 0.5$, $0 \leq v \leq 0.2$, and $0 \leq p \leq 0.2$.

6. The lithium secondary battery of claim 3, wherein the negative electrode active material comprises a carbon-based negative electrode active material, a silicon-based negative electrode active material, or a mixture thereof.

7. The lithium secondary battery of claim 6, wherein the negative electrode active material comprises the carbon-based negative electrode active material and the silicon-based negative electrode active material.

* * * * *